A. H. KERR.
PRESERVING JAR.
APPLICATION FILED MAY 12, 1915.
1,152,107.
Patented Aug. 31, 1915.
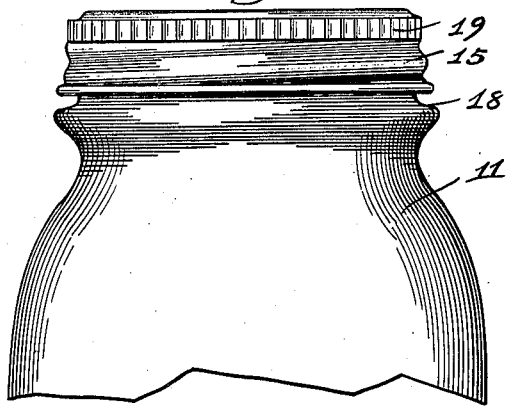
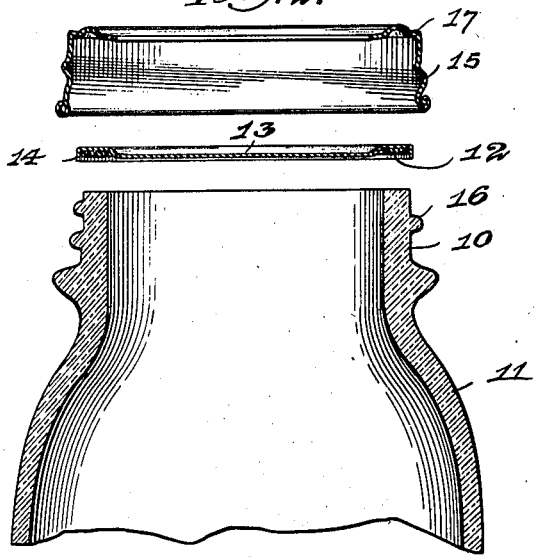
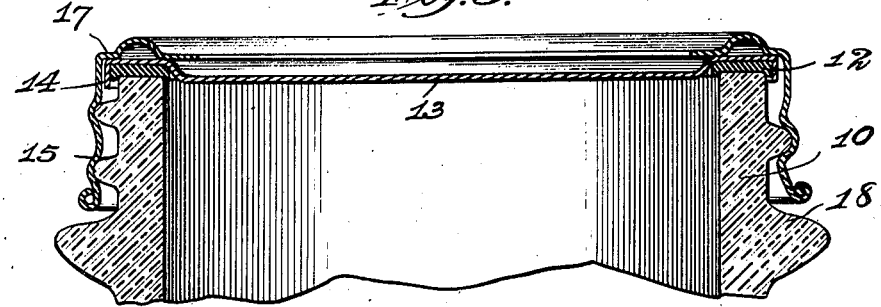
Inventor:
Alexander H. Kerr
By Offield Towle Graves Offield

UNITED STATES PATENT OFFICE.

ALEXANDER H. KERR, OF CHICAGO, ILLINOIS.

PRESERVING-JAR.

1,152,107.

Specification of Letters Patent.  Patented Aug. 31, 1915.

Application filed May 12, 1915.  Serial No. 27,495.

*To all whom it may concern:*

Be it known that I, ALEXANDER H. KERR, a citizen of the United States, residing at Chicago, in the county of Cook and State of Illinois, have invented certain new and useful Improvements in Preserving-Jars, of which the following is a specification.

My invention relates to improvements in preserving jars, and has particular reference to an improved closure for Mason jars, which term I define broadly as covering preserving jars for household use in which the neck of the jar is threaded to permit the application of the closure by screwing a threaded member thereon.

So far as I am aware, Mason jars have never up to this time been considered absolutely satisfactory for use in the home in preserving fruits, meats or vegetables, for a number of reasons. In the first place, all of the Mason jars which have so far been brought to my attention have been equipped with a vulcanized rubber ring or gasket which is supposed to accommodate itself to any slight inequalities present in the glass of the jar when forced down into engagement therewith by the threaded member, and thus prevent access of air to the interior of the jar. However, I have found that in many cases the rubber sealing ring or gasket rots rapidly and loses its initial elasticity. In time, the surface of the rubber cracks and becomes porous, frequently within from one to three months after it has been placed in service. The result is an imperfect seal and air leaks into the jar. Although the leakage may be slight, the contents of the jar, particularly if vegetables, or meat, or fruit put up without the use of sugar or other preservatives, rapidly commence to putrefy and decompose, rendering the contents of the jar unfit for consumption. Another objection has been due to the fact that the glass jar in course of manufacture often develops a warped surface, crizzles, or other imperfections, which render it difficult, and in most cases impossible, to screw down the cap of the jar with enough force to compress the rubber sufficiently at all points so as to effect the proper seal.

In the past attempts have been made to produce and market what are called in the trade "glass-top" jars, in which a rubber ring is compressed between a glass cap and a sealing seat on the mouth of the glass jar. However, the glass-top jar has not been found to be practical on account of the fact that the rubber ring cannot accommodate itself to the double variation of the irregularities of both the jar and the cap. In course of manufacture, the glass caps, being relatively thin, warp greatly,—more so than the jar itself.

The caps of the ordinary Mason jar have heretofore usually been constructed of zinc. However, it has been found that the food acids present in the contents of the jar act chemically upon the metal of the cap and corrode the same; in many cases so badly that the zinc cap must be thrown away after a comparatively short time,—say, one, two or three years. It is a well known fact that the zinc compounds formed by the action of food acids upon the metal of the cap are extremely poisonous, and many deaths have resulted from the use of ordinary Mason jars. Attempts have been made to prevent the fruit acids from coming in contact with the zinc by inserting a glass disk in the top of the cap inside the jar, but these constructions have not been successful because the rubber ring was placed outside the glass and so did not prevent liquid in the jar from finding its way around the edges of the mouth of the jar and the glass disk, and thus gaining access to the metal of the cap, particularly if, as usually is the case, the housewife reverses the jar to determine whether the rubber ring is leaking.

Owing to the objections above referred to, in all of the prior art Mason jars which have hitherto been brought to my notice, the use of them for domestic purposes has been almost exclusively confined to the canning of fruits in which sugar is used as a preservative.

Owing to the difficulty of obtaining a perfect seal with a rubber ring, by reason of the imperfections of the rubber ring and of the glass, which become more and more serious the larger the dimensions of the mouth of the jar, and also because it is impossible to compress a rubber ring of large size sufficiently to make a proper seal, Mason jars, so far as I am aware, have hitherto been made with a comparatively narrow mouth. This is objectionable because it is often desired to preserve fruits, etc., whole, without being compelled to cut them up into small pieces, and a small mouth also increases the difficulty of cleaning the interior of the jar.

The purpose of my invention is to provide an improved preserving jar of the Mason type in which meat, vegetables, fruit, and all other foods can be preserved in safety for an indefinite period without the use of sugar or other preservatives, and at a low cost.

Subsidiary objects of the invention are, to provide a construction in which the closure may be effected without the exercise of manual skill or strength; to provide an improved jar construction of the Mason type in which the seal is rendered effective by the partial vacuum established in the jar by the cooling of the contents after the closure is applied; to provide an improved construction which does not depend upon the retention of its original physical properties by a substance such as vulcanized rubber; to provide extremely simple and economical sealing means so organized and constructed that the screw-threaded member is practically indestructible and will last a lifetime, and in which the actual sealing element may be renewed at insignificant cost; to provide a jar closure of the class described which may be applied to a Mason jar having an unusually wide mouth so as to permit the insertion of whole fruit, vegetables, etc., while at the same time obtaining a hermetically airtight seal which will preserve the contents perfectly for an indefinite period; to provide a jar which can be sealed by the housewife without exerting any strength, but in substantially the same manner as the original Mason jars, so that the housewife is not compelled to learn a new method; to provide a construction in which the supply parts are comparatively light in weight and may be furnished by the manufacturer to the consumer through the mail at slight expense; to provide an improved Mason jar which shall be simple and economical in construction; and, in general, to provide an improved Mason jar of the character referred to.

My invention, both as to its construction and application, will be readily understood by reference to the accompanying drawings, in which—

Figure 1 is an elevation of the upper portion of a Mason jar constructed according to my invention, with the closure in place; Fig. 2 is a sectional elevation of the jar, the parts of the closure being separated to illustrate the details of construction; and Fig. 3 is an enlarged fragmentary vertical section through the neck of the jar, showing the parts assembled, as in Fig. 1.

Referring to the drawings, it will be seen that the lip or mouth of the neck 10 of the jar is absolutely flat and horizontal across the mouth, this flat surface of the mouth of the jar constituting the sealing area. The actual sealing of the jar is effected by an annular airtight sealing element 12 which is permanently secured in position in a slight annular recess in the outer edge of a sealing disk or lip 13; said recess, as shown in Fig. 3, is slightly deeper than the thickness of the sealing element 12, and the outer edge of the recess is formed by a circular flange 14 which projects down slightly beyond the lower surface of the sealing element. The flange 14 and the inner side of the recess are effective in preventing spreading of the sealing element when the jar is sealed. The disk 13 is constructed of a high grade of tin plate, which after being stamped out the required shape, is coated with a high grade of enamel or lacquer, thoroughly baked into the surface of the tin. Said enamel or lacquer thus baked onto the inner surface of the lid or disk, constitutes an efficient protective coating against the action of any fruit acids or organic material present within the jar, and thus the formation of poisonous compounds by reason of the contents coming in contact with naked metal, such as zinc, within the interior of the jar, is prevented.

The material which I have found particularly suitable for the air-tight sealing element is a compound which preferably includes as one of its chief ingredients, balata, in conjunction with suitable compounding substances. For instance, among other suitable materials, I may use one of those described in my United States Patent No. 930,481, August 10, 1909, or No. 930,482, August 10, 1909. As described in the patents referred to, this sealing compound becomes plastic and sticky at a temperature of in the neighborhood of 120° F. This property of the sealing compound incidentally makes it possible for me, in the course of manufacture, to apply the sealing element to the disk by heating the disk slightly while the sealing element is being applied, or, if desired, the compound may be glued, cemented, or forced into the recess of the disk by any approved method. In any case, the sealing element is intended to be secured permanently to the disk, so that the new lids or disks are always furnished to the user with the sealing element in its proper position in the recess of the lid, and there is no danger of misplacing or losing the seal. The plastic character of this sealing compound renders the material particularly suitable for sealing purposes in connection with preserving jars of the type referred to, for the reason that it is almost a universal practice when preserving food in these jars to cook or sterilize the same by heating the contents to the boiling point of water, or, in some cases, to an even higher temperature. Since this temperature is ample to render the sealing compound plastic, the latter, by reason of the slight external pressure applied by the screw-band 15, to be described later, fills up any minute imperfections present in the flat surface of the mouth, and effectively and permanently seals the jar.

The effectiveness of the seal is naturally increased enormously by reason of the partial vacuum present in the interior of the jar when the contents have cooled.

The screw-band 15, as shown in Figs. 2 and 3, is a comparatively narrow ring of metal, screw-threaded upon its cylindric surface so as to engage a single thread 16 molded into the exterior of the neck of the jar. In order to facilitate the application or removal of the screw-band 15, the upper part of the cylindric surface thereof is corrugated, as shown at 19, thus furnishing the necessary grip when screwing the band on or off the neck. The upper edge of the said screw-band 15 is made with an annular flange 17, of suitable diameter to engage the upper side of the sealing disk 13 and force the same toward the flat mouth of the jar.

The screw-band 15 is made with a flange 17 instead of being imperforate and continuous across the top of the disk 13, for two reasons: In the first place, this construction enables me to effect a considerable saving in metal, the blanks which are punched out being afterward used for making disks or lids of smaller size; in the second place, the flange enables a much better seal to be obtained. A close inspection of Fig. 2 will show that the inner edge of the flange 17 projects downwardly slightly below the inner corner of the band, so that when the band is screwed down upon the neck of the jar, the inner edge of the flange 17 is the part which first makes contact with the outside of the disk 13. The point where said contact is first effected is substantially above and in line with the inner edge of the jar mouth and of the sealing element 14. It will be noticed that in the flange 17 there is formed an outwardly propecting hollow bead which, in conjunction with the fact that the band 15 has a flange only, and does not extend entirely across the mouth of the jar, makes the flange 17, to a certain extent, resilient so that after the inner portion of the flange 17 has been screwed down into contact with the lid, a slight additional screwing movement imparted to the member 15 causes the outer corner of the flange 17 to engage the outer edge of the disk 13. Thus, it will be seen that when the member 15 has been screwed down into its proper place, the lid 13 is securely held across the entire width of the seat and has no tendency to tip. It will be observed also that the sealing element 14 is comparatively thin, compared with the width of the seat on the mouth of the jar, and it is wide enough to extend across the entire seat, so that there is sufficient sealing area to form an absolutely hermetically air-tight seal and effectually prevent air from entering the jar. As previously stated, the sealing compound 14 becomes quite plastic under heat and is forced into the minute imperfections in the surface of the glass when the screw-band is applied. The flange 14, which is slightly greater in diameter than the outer edge of the sealing seat in the mouth of the jar, projects some distance below the edge of the sealing element, so that when the latter is pressed by the screw-band when warm enough to be plastic, the edge of the sealing element cannot be squeezed out to an undue extent beyond the outer boundary of the seat. The screw-band 15 I prefer to construct of inexpensive metal, such as tin, which is enameled by baking, in the same manner as is the disk 13. I thus obtain a construction in which all the parts are rendered immune to the action of organic compounds, and corrosion and the formation of poisonous metallic salts or compounds is entirely prevented.

In practice, I make the glass jar of an exceptionally tough grade of white flint glass, which enables me to secure an extremely flat and horizontal sealing mouth, free from imperfections due to warping in cooling, crizzles, or other causes. Such a grade of glass also decreases the risk of breakage very materially. As previously described, the metal of the disk or lid is extremely thin, and so allows it to accommodate itself to any slight irregularities of pressure or slight imperfections of the various parts. In order to enable the housewife to make use of existing stock of ordinary zinc caps and rubbers which she has on hand, intended for the old-fashioned jars, I prefer to form below the screw threads of the neck of the jar an annular shoulder 18, by means of which the housewife can equip my improved jar with an ordinary zinc cap and rubber of the old Mason type, if she wishes to do so. Such an arrangement, however, as previously stated, is not practical when putting up meats, vegetables, or other foods, without the use of sugar or other preservatives.

The screw-bands 15, made and used as above described, will last a life time. The sealing disks with the sealing element attached are ordinarily never used more than once, since they may be furnished as cheaply as rubber rings, and it is more economical to throw them away than to attempt to use them twice; hence, all lids and sealing element when applied to the jars are always new and absolutely perfect, and there is no possibility of spoiling the contents by using imperfect parts.

My jar does not depend solely for a seal upon the gentle pressure exerted by the screw-band, since, as above described, the cooling of the contents of the jar produces a partial vacuum within the same after the screw-band holds it in place, causing the lid to be forced strongly inwardly by the pressure of the atmosphere. By reason of the highly finished flat and horizontal surface of the mouth of the jar and the use of a sealing compound which is plastic when hot, a very slight amount of manual force is all that is necessary when screwing down the lids or disks by means of the screw-bands. Although a partial vacuum is generally produced (when the contents are properly sterilized), after the jar is closed, it is sometimes found that the sterilization, although it may have been carried far enough to prevent formation of poisonous compounds, is not absolutely perfect, and a slight amount of reaction consequently takes place within the jar. This often results in the formation of gas and causes an increase in pressure within the jar, in some cases sufficient to negative the vacuum effect. However, by reason of the screw-band which holds the lid securely in place, there is no possibility for the latter to rise off the mouth of the jar and cause a leak; hence, the plastic seal is always maintained in its original perfect condition, independent of the pressure within the jar.

As previously stated, I obtain by the use of my jar a hermetically air-tight seal which is so perfect that the jar may be used for the preserving of meats and vegetables, and also for fruits without the use of sugar or other preservatives; hence, all kinds of foods may be kept, at a very slight expense, for an indefinite period, and remain sweet and wholesome. The economy effected in the putting up of fruits without having to use sugar, as with the old-style jars, is very marked. The housewife is thus enabled to effect great saving over the old method.

It should be understood that certain details of the construction shown and described may be modified slightly without departing from the spirit of the invention, which is not intended to be limited, except as specified in the appended claims.

I claim—

1. The combination of an open-ended glass jar provided with an annular outwardly facing seat at the mouth of the jar, a thin flexible metallic sealing disk fitting over the mouth of said jar, an annular sealing element permanently secured to the inner side of said disk of suitable diameter to engage said seat, and of composition adapted to become plastic at a temperature of less than 212 degrees Fahrenheit to accommodate itself to irregularities of the surface of said seat, and an exterior screw band threaded upon the neck of said jar and having an inwardly projecting annular portion adapted to engage the outside of the disk and force the same toward said seat to compress said sealing element between said seat and said disk.

2. The combination of an open-ended glass jar, its mouth constituting a substantially flat outwardly facing seat, a thin, flexible, metallic sealing disk fitting over the mouth of said jar and provided with an annular recess inwardly facing toward said seat, an annular sealing element secured to the inner side of said disk and within said recess of suitable diameter to engage said seat, and of plastic composition adapted to soften when raised to a temperature of less than the boiling point of water, an exterior screw band threaded upon the neck of said receptacle and having an inwardly projecting annular portion adapted to engage the disk and force the same toward said seat and compress said sealing element between said seat and said disk.

3. The combination of an open-ended glass preserving jar, provided at its mouth with a flat, outwardly facing seat, a thin, flexible, acid-proof, metallic sealing disk fitting over the mouth of said jar and provided with an annular recess registering with the flat mouth of said jar, said disk having a turned down flange greater than the outer diameter of the mouth of the jar forming the outer boundaries of said recess, a comparatively thin annular sealing element of compound, plastic above ordinary maximum atmospheric temperature and below the boiling point of water, secured to the inner side of said disk in said recess, registering with the flat mouth of the jar, and covering the greater portion of the area of the seat, and an exterior screw band threaded upon the neck of said jar and adapted to force the disk toward the mouth of the jar and compress the sealing element between the under side of the disk and the flat-mouthed seat of said jar.

4. The combination of an open-ended preserving receptacle provided with an annular comparatively wide outer seat, a sealing lid fitting over the end of said receptacle, a wide annular sealing element, registering with said seat, interposed between said seat and lid and permanently secured to said lid, and an external screw band threaded upon the neck of said receptacle and adapted to force the lid toward said seat and compress said annular plastic sealing element between said lid and seat, said band having a resilient inwardly projecting annular portion adapted initially to engage the lid on a circle of relatively small diameter, and finally upon a circle of larger diameter when the band is screwed home.

ALEXANDER H. KERR.

Witnesses:
C. A. SOANS,
EMILIE ROSE.